(12) United States Patent
Little

(10) Patent No.: US 10,096,065 B2
(45) Date of Patent: Oct. 9, 2018

(54) DISTRIBUTED TRANSACTIONS WITH EXTENDED LOCKS

(71) Applicant: Red Hat, Inc., Raleigh, NC (US)

(72) Inventor: Mark Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 625 days.

(21) Appl. No.: 14/599,271

(22) Filed: Jan. 16, 2015

(65) Prior Publication Data

US 2016/0210627 A1    Jul. 21, 2016

(51) Int. Cl.
*G06Q 40/02*    (2012.01)

(52) U.S. Cl.
CPC .................... *G06Q 40/02* (2013.01)

(58) Field of Classification Search
CPC ..................................... G06Q 40/02
USPC ....................................... 707/704
See application file for complete search history.

(56) References Cited

U.S. PATENT DOCUMENTS

| | | |
|---|---|---|
| 6,526,416 B1 | 2/2003 | Long |
| 7,380,166 B2 | 5/2008 | Thatte et al. |
| 7,386,675 B2 | 6/2008 | Fachan |
| 7,552,072 B2 | 6/2009 | Mulholland et al. |
| 8,010,756 B1 | 8/2011 | Linde |
| 8,346,851 B2 | 1/2013 | Little |
| 8,347,300 B2 | 1/2013 | McLean et al. |
| 8,386,440 B2 | 2/2013 | Lomet et al. |
| 8,464,270 B2 | 6/2013 | Little |
| 8,612,989 B1 | 12/2013 | Richards et al. |
| 2002/0194244 A1 | 12/2002 | Raventos |
| 2011/0246822 A1 | 10/2011 | Little |
| 2012/0089784 A1* | 4/2012 | Surtani ................ G06F 12/126 711/136 |
| 2012/0117304 A1* | 5/2012 | Worthington ....... G06F 12/0223 711/103 |
| 2013/0107653 A1* | 5/2013 | Kwak ..................... G11C 7/00 365/218 |
| 2014/0173035 A1* | 6/2014 | Kan .................... H04L 67/1095 709/217 |
| 2015/0324444 A1* | 11/2015 | Chercoles S nchez ...................... G06F 17/30545 707/703 |
| 2016/0019300 A1* | 1/2016 | Dove ................ G06F 17/30115 707/731 |

OTHER PUBLICATIONS

Daniel M. Gutterman "iOS Passcode: Waiting Intervals for Failed Attempts" Cinnamon Thoughts, Sep. 13, 2010.*

(Continued)

*Primary Examiner* — Boris Gorney
*Assistant Examiner* — Allen Lin
(74) *Attorney, Agent, or Firm* — K&L Gates LLP

(57) ABSTRACT

Various examples are directed to systems and methods for distributed transactions with extended locks. A transaction node may receive from a coordinator node an instruction to execute an assigned operation on an object. The assigned operation may be part of a distributed transaction. The transaction node may obtain a lock associated with the object and execute the assigned operation. The transaction node may also set a time-to-expiration of a lock timer to an initial value and start the lock timer. When the transaction node determines that the lock timer has expired, it may release the lock.

21 Claims, 6 Drawing Sheets

(56) References Cited

OTHER PUBLICATIONS

Dinn et al., "Transactions XTS Administration and Development Guide," Jul. 12, 2010, downloaded from http://docs.jboss.org/jbosstm/4.17.0.Final/guides/xts-administration_and_development_guide/index.html on on Nov. 27, 2014.
Jankiewicz et al., "Transaction Mechanisms in Complex Business Processes," Control and Cybernetics, vol. 40, No. 3 (2011).
Kang et al., "STAR: Secure Real-Time Transaction Processing with Timeliness Guarantees," downloaded from http://www.cs.virginia.edu/~stankovic/psfiles/star.ps. on Jan. 15, 2014.
Salzberg et al., "DSDT: Durable Scripts Containing Database Transactions," Proceedings of the Twelfth International Conference on Data Engineering, pp. 624-633, 1996.
Stadtfeld et al., "Analysing Event Stream Dynamics in Two Mode Networks," 2010. Downloaded on Jan. 15, 2015 from http://www.insna.org/PDF/Awards/awards_student_2010.pdf.
"Managing Resources," downloaded from http://www.scimore.com/Documentation/Managing_resources.html on Dec. 1, 2014.
"Teradata Viewpoint, User Guide" Release 14.00, B035-2206-111A, Nov. 2011, downloaded from http://d289lrf5tw1zls.cloudfront.net/doc/viewpoint/14.00/2206_User_14.00.pdf on Jan. 15, 2015.

* cited by examiner

DISTRIBUTED TRANSACTIONS WITH EXTENDED LOCKS

BACKGROUND

A distributed transaction is a transaction including operations that are performed by multiple nodes, often implemented at multiple networked computer systems. Distributed transactions arise in a number of different contexts. For example, processing an employee's paycheck may involve a distributed transaction with operations performed by a number of nodes at different individual computer systems. An employer payroll system node may request a transfer from its own account to the account of the employee. A system at the employer's bank may debit the employer's account by the amount of the transfer. A system at the employee's bank may credit the employee's account by the amount of the transfer. In another example, booking travel may involve a distributed transaction. A travel agent system may request reservations on various flights, hotels, etc. In response to the requests, one or more airline systems may book flight tickets for a traveler. One or more hotel systems may create reservations for the traveler, etc.

In distributed transactions, it is important to ensure coordination among the participating computer systems. For example, if one operation fails, then the other operations should be either prevented or reversed. Referring to the paycheck example, if the employer's bank system crashes or otherwise fails to debit the employer's account, then it is desirable to prevent the employee's bank system from completing the transfer to the employee's account. Referring to the travel example, if the travel agent system requests a Monday flight, but the airline indicates that the first available flight is not until Tuesday, then it is desirable to prevent the hotel system from booking a room for Monday night.

A number of existing techniques are used to ensure coordination in distributed transactions. For example, a transaction manager (e.g., a coordinator node) may coordinate a distributed transaction according to an atomic commit protocol, such as a two-phase or three-phase commit protocol. In a first phase, commonly known as a prepare phase, the coordinator node asks all other nodes participating in the transaction whether they will commit to the transaction. Nodes may determine whether they are able to commit to the transaction, for example, by attempting to obtain an appropriate lock for an object or resource to be manipulated in the transaction and attempting to execute their assigned transaction operation. In the paycheck example above, for instance, the employer's bank system may attempt to obtain a lock for a data unit indicating the employer's account and attempt to update the account. Obtaining the lock may prevent other processes from modifying and sometimes from even reading data describing the employer's account until the distributed transaction is complete. If a node is successful in obtaining a necessary lock or locks, and successfully executes the operation, it may commit to the transaction. On the other hand, if a node is unsuccessful in obtaining a necessary lock or locks or fails to execute the operation, it may decline to commit to the transaction. When a node commits to a transaction, the node executes its operation or operations and then continues to hold its lock or locks until the node is instructed by the coordinator to either complete or abort the transaction.

In a subsequent phase of an atomic commit protocol, commonly known as the commit phase, the coordinator node determines whether the transaction should be completed, for example, based on whether any of the nodes failed to commit. For example, if during the prepare phase all participating transaction nodes committed to the transaction, the coordinator node successfully completes the transaction. When the transaction is successfully completed, the participating transaction nodes release their locks. If during the prepare phase one or more participating transaction nodes failed to commit to the transaction, the coordinator node aborts the transaction. When the transaction is aborted, the participating transaction nodes reverse their operations and release their locks.

An atomic commit protocol can be used only when the coordinator node and the various participating transaction nodes are specifically configured. When one or more participating transaction nodes are not configured for an atomic commit protocol, the distributed transaction may be implemented according to a compensation transaction format. According to a compensation transaction, participating transaction nodes execute their assigned operation or operations and release their locks before it is known whether the distributed transaction has succeeded or failed. A compensation action is generated for each participating transaction node. The compensation action reverses the transaction node's assigned operation or operations. If the distributed transaction fails (e.g., if one of the participating transaction nodes cannot execute its assigned operation), then the coordinator node instructs any participating transaction nodes that have already executed operations to reverse the operations by executing their compensation actions.

SUMMARY

Various examples are directed to systems and methods for distributed transactions with extended locks. A transaction node may receive from a coordinator node an instruction to execute an assigned operation on an object. The assigned operation may be part of a distributed transaction. The transaction node may obtain a lock associated with the object and execute the assigned operation. The transaction node may also set a time-to-expiration of a lock timer to an initial value and start the lock timer. When the transaction node determines that the lock timer has expired, it may release the lock.

FIGURES

Various examples are described herein in conjunction with the following figures, wherein.

DESCRIPTION

Figure 1:
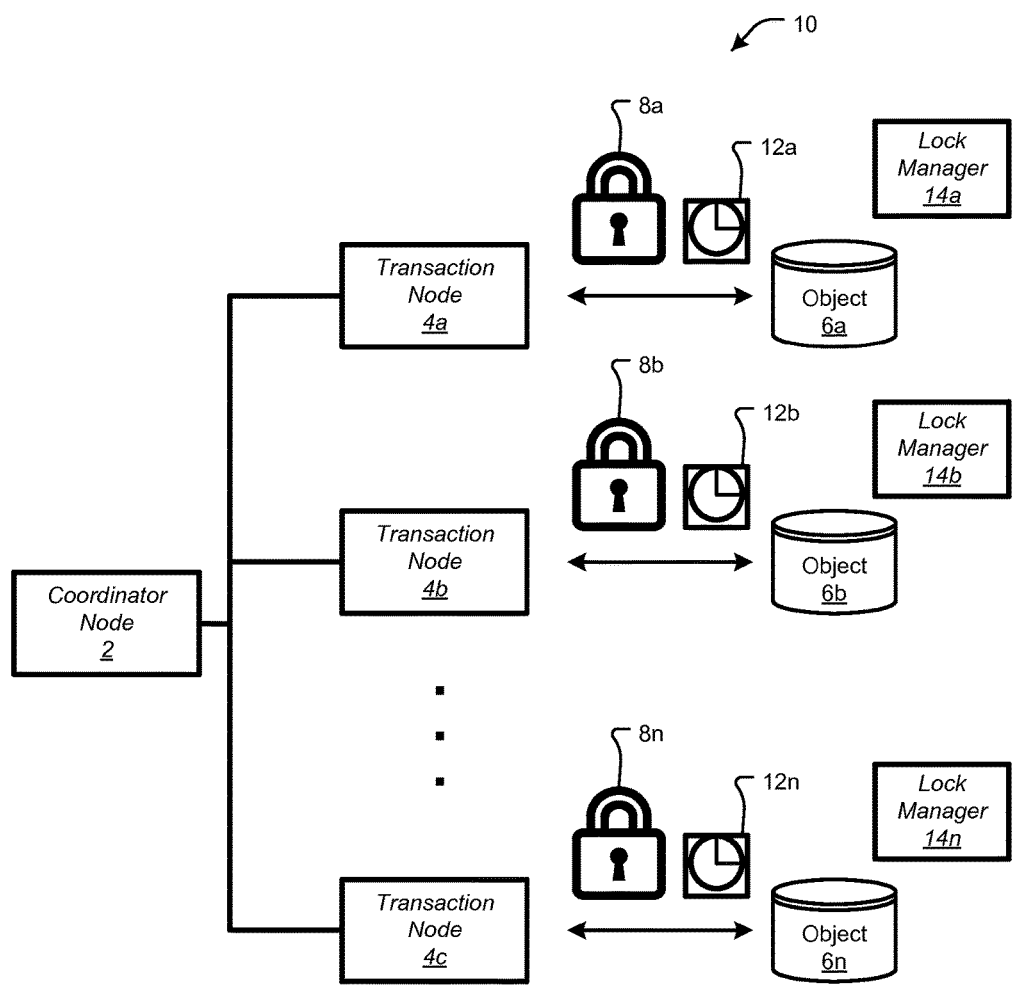
FIG. 1 is a diagram showing one example of an environment for a distributed transaction with extended locks.

Various examples are directed to systems and methods for implementing compensation transactions while holding a locks for an extended period after completing a transaction operation. In a compensation transaction (e.g., a distributed transaction executed according to a compensation transaction format), participating transaction nodes execute transaction operations immediately (e.g., upon receiving an instruction from a coordinator node). The transaction nodes obtain locks for one or more objects manipulated during an operation, and typically release the locks immediately after the operation is complete. As soon as a participating transaction node releases its locks, other processes may be able to read or write to the objects, even if the distributed transaction later fails. This can cause difficulties if the distributed transaction is ultimately aborted. For example, if another process modifies one or more of the objects before the compensation action is executed, or holds a lock on one or more of the objects when the transaction node attempts to execute the compensation action, then the compensation action may fail. Also, for example, if another process reads one or more of the objects after execution of the transaction operation but before execution of the compensation action, the other process may proceed with an erroneous value for the object.

Referring to the paycheck example from above, a participating transaction node at the employer's bank system may perform a transaction operation that involves debiting the employer's account balance. The transaction node may obtain a write lock on data describing the employer's account balance. After debiting the employer's account by the amount of the transfer, the participating transaction node may release the lock. After the lock is released, other processes can access and modify the employer's account balance. If the distributed transaction fails (e.g., if the employer's bank system fails to credit the employer's account), then a compensation action may be attempted at the employer's bank system to reverse the debit. If another process has further modified the account balance, or holds a lock on the account balance data, however, the compensation action may fail. For example, if the account was closed, it may not be possible to re-credit the transfer amount. Also, if another process has read and relied on the account balance between the time of the debit and the time of the compensation transaction, then the other process may fail as a result of relying on incorrect balance data.

Various examples described herein may reduce compensation transaction failures by configuring participating transaction nodes to hold locks for an extended period after completing a transaction operation. This may minimize opportunities for other processes to write and/or read to a transaction object that may later be modified by a compensation action. It may also allow the transaction node to re-access the object if further modification is desired (e.g., as part of a subsequent operation of the original transaction or as part of a new transaction). In some examples, a transaction node may associate a lock timer with a requested lock. The lock timer may expire after a time-to-expiration has elapsed. After completing its transaction operation, the participating transaction node may hold its lock or locks until the lock timer expires.

FIG. 1 is a diagram showing one example of an environment 10 for a distributed transaction with extended locks. A coordinator node 2 may enroll one or more participating transaction nodes 4a, 4b, 4n. Any suitable number of transaction nodes 4a, 4b, 4n may be used, for example, based on the nature of the compensation transaction. Each transaction node 4a, 4b, 4n may perform an assigned transaction operation that involves manipulating a transaction object 6a, 6b, 6n. Objects 6a, 6b, 6n may be any type of resource, such as resources having a state that can be manipulated. Examples may include data files, databases, database tables, messaging systems, language level objects, etc.

Figure 2:
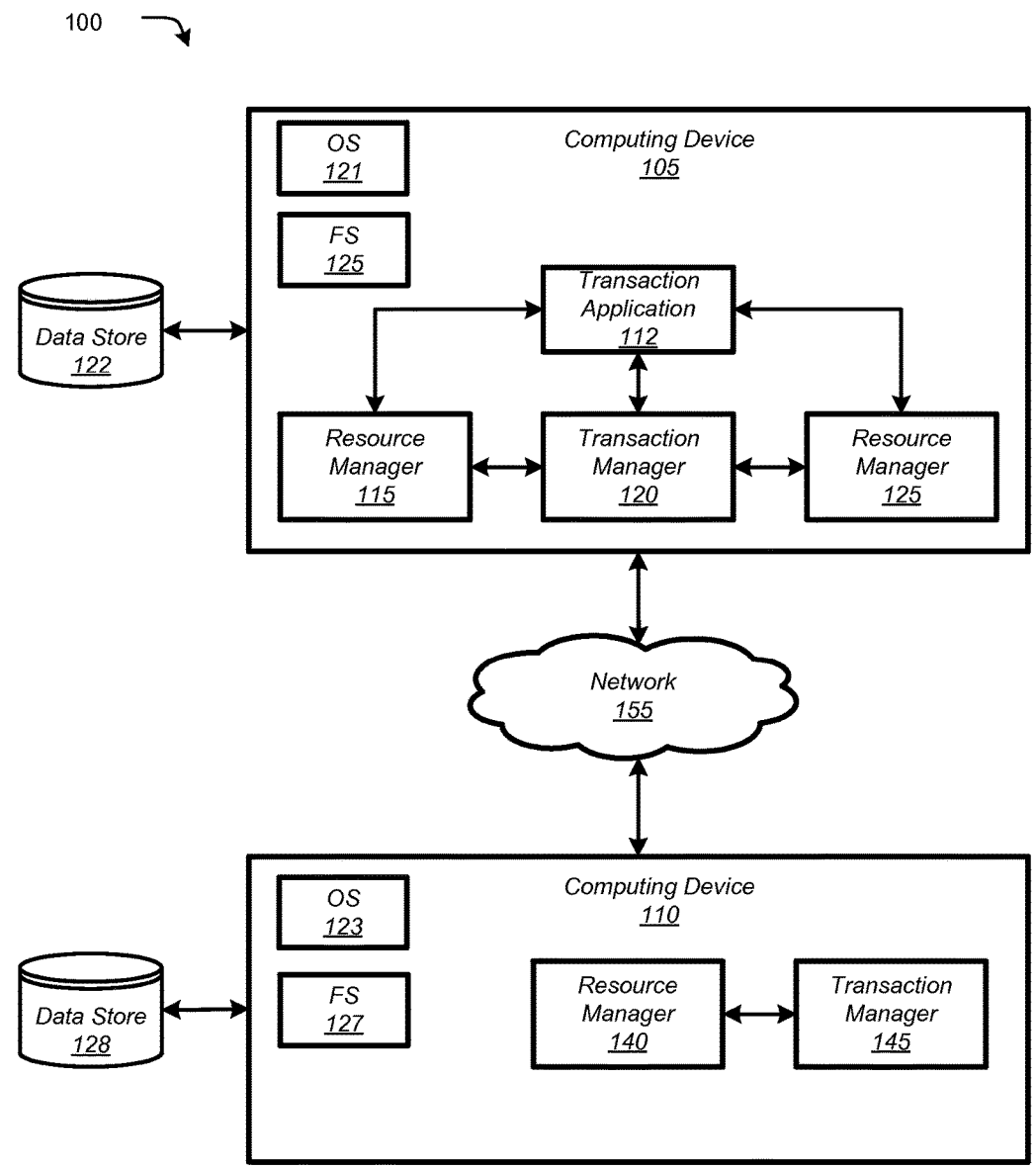
FIG. 2 illustrates an example of a distributed computing system that may execute various components of a distributed transaction with extended locks.

The coordinator node 2 may enroll each of the transaction nodes 4a, 4b, 4n to perform the assigned operation on one or more objects 6a, 6b, 6n. The transaction nodes 4a, 4b, 4n may be enrolled in any suitable order. For example, the coordinator node 2 may enroll the transaction node 4a first. When enrolled, each transaction node 4a, 4b, 4n may obtain one or more locks corresponding to the object or objects to be manipulated according to the node's assigned operation. In the example illustrated in FIG. 1, the transaction node 4a obtains a lock 8a for the object 6a. The lock 8a may be obtained from a lock manager 14a. The lock manager 14a may be executed at a computing device at or near a computing device where the object 6a is stored. The lock manager 14a may be positioned to intercept read and write requests directed to the object 6a. For example, the lock manager 14 may be part of an operating system, a file system, or other similar component executing at a computing device that is positioned to manage the object 6a. In some examples, the lock managers 14a, 14b, 14c, 14n may be implemented in hardware, for example, by a suitable data storage device 122, 128 (FIG. 2). In some examples, some or all of the objects 6a, 6b, 6c, 6n may share a common lock manager. After obtaining appropriate locks, the transaction node 4a may perform its assigned transaction operation. Instead of releasing the lock 8a immediately after completing the operation, the transaction node 4a may release the lock 8a upon the expiration of a lock timer 12a. Similarly, the transaction nodes 4b, 4n may hold their respective locks 8b, 8n until the expiration of lock timers 12b, 12n.

FIG. 2 illustrates an example of a distributed computing system 100 that may execute various components of a distributed transaction with extended locks. For example, the distributed computing system 100 may execute the coordinator node 2, participating transaction nodes 4a, 4b, 4n and other components described above. The distributed computing system 100 may comprise one or more computing devices 105, 110. The computing devices 105, 110 may comprise any suitable type of computing device or machine that has a programmable processor including, for example, one or more servers, one or more desktop computers, one or more laptop computers, one or more routers, etc. In some examples, one or both of the computing devices 105, 110 may comprise a single machine or may include multiple interconnected machines (e.g., multiple servers configured in a cluster). Although two computing devices 105, 110 are shown, any suitable number of computing devices may be utilized in the distributed transactions described herein.

Computing devices 105, 110 may execute respective operating systems (OSs) 121, 123. Any suitable operating system may be used including, for example, any suitable LINUX operating system (e.g., available from RED HAT, INC.), any suitable WINDOWS operating system available from MICROSOFT CORPORATION, any suitable UNIX operating system, any suitable OS operating system available from APPLE, INC., any suitable ANDROID operating system available from GOOGLE, any suitable iOS operating system available from APPLE INC., etc. The operating systems 121, 123 may manage execution of the various other components at the computing devices 105. In some examples, the operating systems 121, 123 may facilitate communication between the components and system hardware, such as data stores 122, 128. In some examples, computing devices 105, 110 comprise and/or are in communication the one or more data stores 122, 128. Data stores 122, 128 may be organized according to a file system 125, 127 that may be in communication with the operating system 121, 123. In some examples, data stores 122, 128 are organized according to and/or comprise any suitable database, and/or other data storage arrangement. Data stores 122, 128 may be internal to computing devices 105, 110, or external and connected to computing device 105, 110 either directly or via a network, such as the network 155. In some examples, data stores 122 may comprise transaction objects, such as 6a, 6b, 6c, 6n described above, that may be manipulated during distributed transactions. In some examples, lock managers 14a, 14b, 14c, 14n described herein may be implemented by the operating systems 121, 123, the file systems 125, 127 and/or the data stores 122, 128.

The computing devices 105, 110 may be in communication with one another via a network 155. The network 155 may be any suitable wired and/or wireless network and may comprise, for example, one or more local area networks (LANs), one or more wide area networks (WANs), one or more public networks such as the Internet, etc. The network 155 may carry communications between components 115, 125, 140, 120, 145 (e.g., components not executing on the same computing device). In some examples, distributed transactions may be executed without using the network 155. For example, the distributed computing system 100 may be implemented on a single computing device 105 or 110. Also, for example, the computing devices 105, 110 may be directly connected to one another.

In the example of FIG. 2, the computing device 105 comprises resource managers 115, 125, a first transaction manager 120, and a transaction application 112. The computing device 110 comprises a resource manager 140 and a transaction manager 145. The resource managers 115, 125, 140 may be or comprise any suitable component of the distributed computing system 100 that is configured to manage objects (e.g., objects stored at the data stores 122, 128). Resource managers 115, 125, 140 may be executed by one or both of the computing devices 105, 110 to manage a storage system, which may be a persistent and stable storage system such as the data stores 122, 128. The resource managers 115, 125, 140 may comprise any manager configured to manage a storage system including, for example, a file manager, a database, a messaging service, etc. Examples of resource managers include relational databases, an executive information system (EIS), a Java Message Service (JMS) provider configured to manage transactional message delivery, etc.

The transaction managers 120, 145 may be executed at one or both of the computing devices 105, 110 and are programmed to coordinate distributed transactions. In some examples, a transaction manager 120, 145 acts as a coordinator node that coordinates multiple participating transaction nodes during a distributed transaction, such as the coordinator node 2. The participating transaction nodes may include, other transaction managers 120, 145, or local resource managers 115, 125, 140. In some examples, transaction managers 120, 145 may take part in distributed transactions as a participating transaction node when a distributed transaction can be broken into constituent distributed transactions. The transaction manager 120 may be configured as a master coordinator node and may instruct one or more of the resource managers 115, 125, 140 to perform one or more operations on objects to implement the transaction. Additionally, the transaction manager 120 may instruct the transaction manager 145 to coordinate a second distributed transaction that is a constituent of the first distributed transaction. Accordingly, the transaction manager 145 may instruct one or more of the resource managers 115, 125, 140 regarding operations according to the second distributed transaction.

The transaction application 112 may be an application that requests a distributed transaction. For example, a referring to the paycheck processing example, a transaction application may be an application at a computing device of the employer that requests the paycheck processing transaction. Referring to the travel booking example, a transaction application may be an application associated with a travel agent, an Internet-provided application with which a user can initiate a reservation request, etc. A transaction manager such as 120, 145 may establish a new transaction upon receiving a request from a transaction application 112 to perform the transaction. A transaction application 112 may be any application that requests that operations be performed transactionally or that otherwise causes distributed transactions to be initiated. The transaction application 112 may be co-located with the first transaction manager 120 (as shown), or may be located on a remote machine (e.g., on computing device 110).

Figure 3:
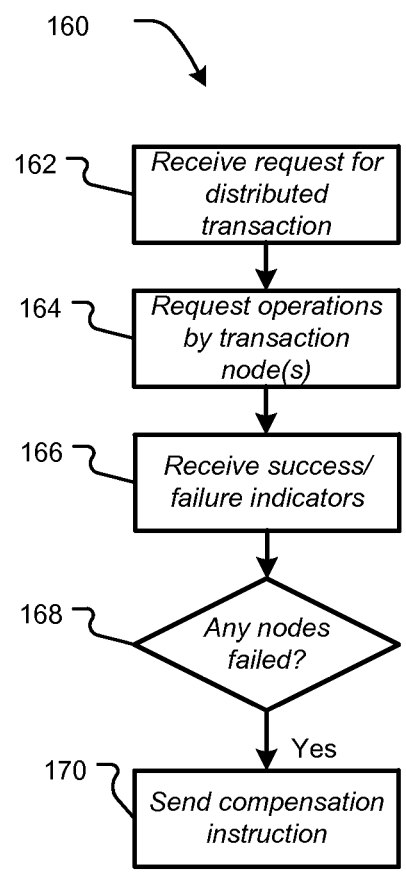
FIG. 3 is a flowchart showing one embodiment of a process flow that may be executed by a coordinator node to coordinate a distributed transaction with extended locks.

FIG. 3 is a flowchart showing one embodiment of a process flow 160 that may be executed by a coordinator node 2 to coordinate a distributed transaction with extended locks. At 162, the coordinator node 2 may receive a request for a distributed transaction, for example, from a transaction application 112. A described herein, a request from a transaction application 112 may be directed to a transaction manager 120, 145. The transaction manager 120, 145 that receives the request may coordinate the distributed transaction, acting as the coordinator node 2, for example, in the manner described herein. At 164, the coordinator node 2 may enroll participating transaction nodes 4a, 4b, 4n, for example, by requesting that each of the participating transaction nodes 4a, 4b, 4n perform an assigned transaction operation. The assigned operations may include, for example, manipulating one or more objects 6a, 6b, 6n. In some examples, requesting that a transaction node 4a, 4b, 4n perform an assigned operation may comprise providing the transaction node 4a, 4b, 4n with one or more parameters of a lock timer 12a, 12b, 12n to be implemented. For example, the coordinator node 2 may provide one or all of the transaction nodes 4a, 4b, 4n with a start time for the lock timer 12a, 12b, 12n, an initial value of a time-to-expiration for the lock timer 12a, 12b, 12n, an access threshold for the lock timer 12a, 12b, 12n, etc.

At 166, the coordinator node 2 may receive from the transaction nodes 4a, 4b, 4n indications of whether the transaction nodes 4a, 4b, 4n were successful or unsuccessful in executing assigned operations. The success or failure indicators may be formatted in any suitable manner and according to any suitable logic. In some examples, each transaction node 4a, 4b, 4n may configured to send a confirmation or success message after its assigned operation or operations are completed. The coordinator node 2 may determine whether a particular transaction node 4a, 4b, 4n was successful by determining whether the success message was received. If the coordinator node 2 fails to receive a success message from a participating transaction node (e.g., within a threshold time period), then the coordinator node 2 may determine that node has failed. Also, in some examples, transaction nodes 4a, 4b, 4n may be configured to send to the coordinator node 2 a failure message when a requested operation or operations has failed. If the coordinator node 2 does not receive a failure message (e.g., within a threshold time period), then the coordinator node 2 may determine that the node 4a, 4b, 4n has succeeded. In some examples, transaction nodes 4a, 4b, 4n may be configured to provide both success messages and failure messages. At 168, the coordinator node 2 may determine whether any of the transaction nodes 4a, 4b, 4n have failed to execute its assigned operation or operations. If any transaction nodes 4a, 4b, 4n have failed, then the coordinator node 2 may, at 170, send to all participating transaction nodes 4a, 4b, 4n a compensation instruction that instructs the nodes 4a, 4b, 4n to execute a compensation action to reverse their assigned operation or operations.

Figure 4:
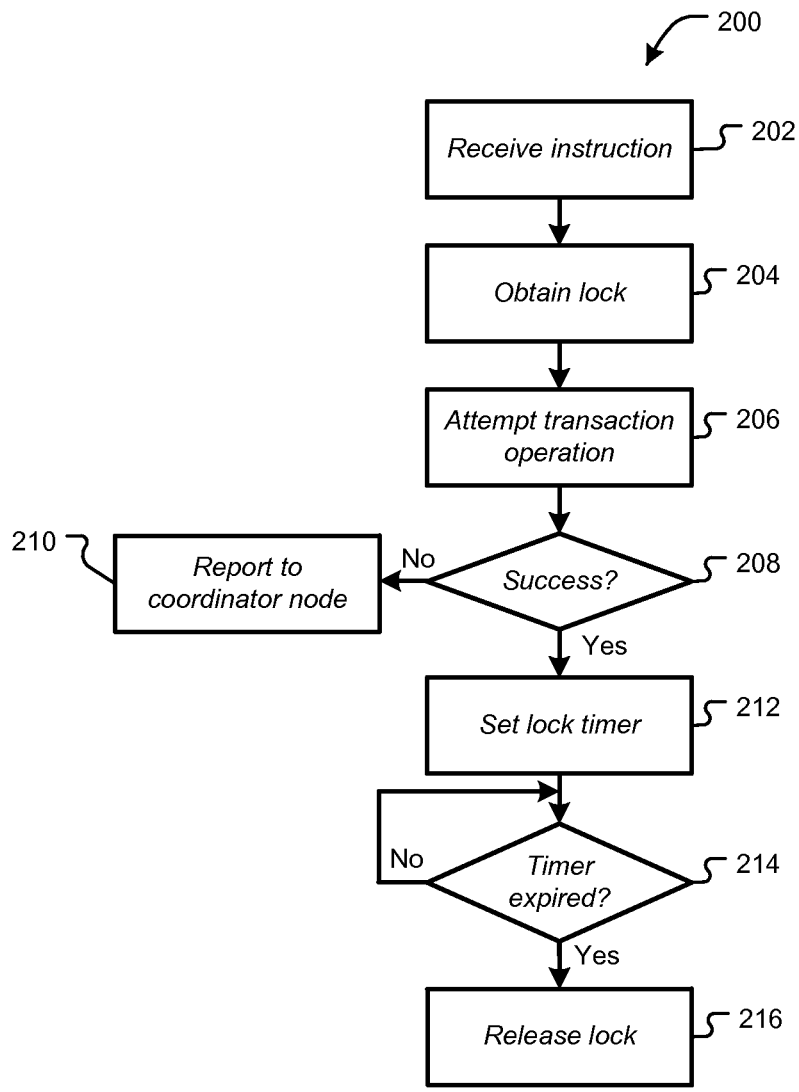
FIG. 4 is a flow chart showing one example of a process flow that may be executed by a transaction node to implement a distributed transaction with extended locks.

FIG. 4 is a flow chart showing one example of a process flow 200 that may be executed by a transaction node 4a to implement a distributed transaction with extended locks. Although the process flow 200 is described as being executed by the transaction node 4a, it may be executed by any participating transaction node 4a, 4b, 4n utilizing a lock timer. Also, in various embodiments, less than all of the participating transaction nodes 4a, 4b, 4n may utilize lock timers 12a, 12b, 12n as described with respect to the process flow 200. For example, one or more transaction nodes 4a, 4b, 4n may implement lock timers 12a, 12b, 12n, as described in the process flow 200, while one or more transaction nodes 4a, 4b, 4n in the same distributed transaction may not utilize lock timers.

At 202, the transaction node 4a may receive an instruction from a coordinator node 2. The instruction may indicate an assigned operation or operations to be executed by the transaction node 4a as a part of a distributed transaction. In some examples, the instruction may also indicate parameters for the lock timer 12a such as, for example, an initial value of the time-to-expiration, a start time, an access threshold, etc. At 204, the transaction node 4a may obtain a lock 8a associated with an object 6a to be manipulated as part of the operation or operations. For example, the transaction node 4a may query an operating system 121, 123, file system 125, 127, and/or data store 122, 128 associated with the object 6a to obtain a write lock. A write lock may prevent processes other than the transaction node 4a from either reading to or writing from the object 6a. At 206, the transaction node 4a may attempt to execute the transaction operation or operations indicated by the instructions from 202, for example, by manipulating the object 6a.

At 208, the transaction node 4a may determine whether it has successfully executed the operation or operations indicated by the instructions from 202. If the transaction node 4a has failed to successfully execute the operation or operations, it may report its failure to the coordinator node 2 at 210 by sending a failure message. In some examples, the transaction node 4a may fail to successfully execute the operation or operations if it fails to successfully obtain the lock at 204. Accordingly, if the transaction node 4a fails to obtain the lock at 204, it may report failure to the coordinator node 2 without further attempting to execute the transaction operation at 206. Also, in some examples, the transaction node 4a may be configured to provide a success message when it successfully executions the transaction operation. In some examples, the transaction node 4a may be configured to send a failure message if it fails to execute the transaction operation or operations and to send a success message if it is successful in executing the transaction operation or operations.

At 212, after determining that the transaction operation or operations were successful, the transaction node 4a may, at 212, set the time-to-expiration of the lock timer 12a to an initial value. The lock timer 12a may be started at the same time that the time-to-expiration is set or at a different time (e.g., a start time received from the coordinator node 2). At 214, the transaction node 4a may determine whether the lock timer 12a has expired. When the lock timer 12a has expired, the transaction node 4a may release the lock at 216. The initial value of the time-to-expiration for the lock timer 12a may be any suitable value. For example, the coordinator node 2 may provide the transaction node 4a with an initial value of the time-to-expiration for the lock timer 12a. In some examples, the initial value of the time-to-expiration may be determined by the coordinator node 2 and may be equal to an expected time for the distributed transaction. The expected time for the distributed transaction may indicate the time during which the coordinator node 2 expects that it will send a compensation instruction, if at all. For example, the expected time may indicate a time by which it is expected that all of the participating transaction nodes 2a, 2b, 2n will have either completed or failed to complete their assigned transaction operations. The coordinator node 2 may determine the expected time for the distributed transaction in any suitable manner. For example, the coordinator node 2 may have access to data describing the time required to complete similar distributed transactions in the past. The coordinator node 2 may aggregate the historical times to complete the similar transactions. For example, the initial value of the time-to-expiration may be set to an average, a median or any other aggregation of the historical times to complete similar transactions. In some examples, the transaction node 4a may determine the initial value of the time-to-expiration, for example, based on historical data. The historical data may include, for example, a historical frequency with which the object 6a or similar objects have been accessed, one or more time-to-expiration values used by the transaction node 4a or similar transaction nodes for previous operations on the object 6a or similar objects, etc.

Although the process flow 200 describes the lock timer 12a as being set after execution of the transaction operation or operations, in some examples the transaction node 4a may set the lock timer 12a before executing the transaction operation or operations. For example, the transaction node 4a may set the lock timer 12a after receiving the instruction 202, at the time that the lock is obtained, etc. In some examples, the transaction node 4a receives from the coordinator node 2 a start time indicating when the lock timer 12a is to be started (e.g., before or after executing the operation).

Figure 5:
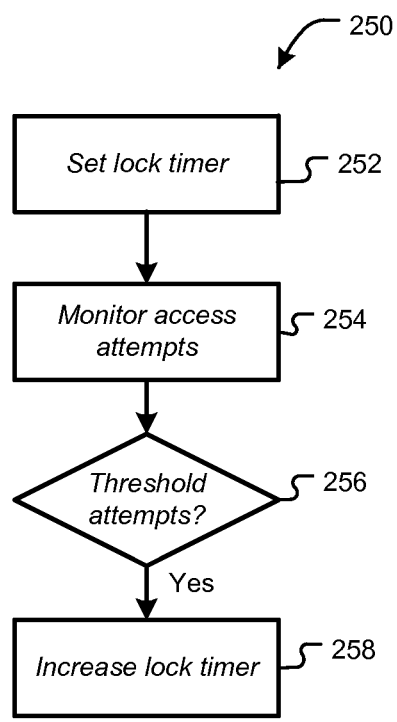
FIG. 5 is a flow chart showing one example of a process flow that may be executed by a transaction node to implement a dynamic lock timer.

In some examples, the transaction node 4a may implement a dynamic lock timer 12a. For example, the transaction node 4a may modify the length of the time-to-expiration for lock timer 12a based on factors such as, for example, a frequency with which the object 6a is accessed by other processes. FIG. 5 is a flow chart showing one example of a process flow 250 that may be executed by a transaction node, such as the transaction node 4a, to implement a dynamic lock timer 12a. Although the process flow 250 is described as being executed by the transaction node 4a, it may be executed by any participating transaction node 4a, 4b, 4n utilizing a lock timer. At 252, the transaction node 4a may set the time-to-expiration of the lock timer 12a to an initial value, as described above. At 254, the transaction node 4a may monitor attempts to access the object 6a. For example, attempts to access the object 6a may be requests (e.g., requests by other processes) for a read lock and/or a write lock for the object 6a. The transaction node 4a may monitor access attempts in any suitable manner. For example, the transaction node 4a may query and/or receive periodic data from an operating system 121, 123 of the computer device 105, 110 executing the transaction node 4a or other component logically positioned to monitor access requests for the object 6a. If, at 256, access attempts to the object 6a exceed a threshold value, the transaction node 4a may increase the time-to-expiration of the lock timer at 258. For example, if an object 6a is being accessed at a relatively high frequency, it may indicate that other processes will likely access the object 6a soon after the lock is released. Accordingly, it may be desirable for the transaction node 4a to remain in possession of the lock for a longer time. The threshold value may be determined any suitable manner. For example, the threshold value may be a raw number of access attempts since the lock was obtained. In some examples, the threshold value may be a frequency of access attempts (e.g., a number of access attempts per unit time). The threshold value may be determined by the coordinator node 2 and/or the transaction node 4a.

Figure 6:
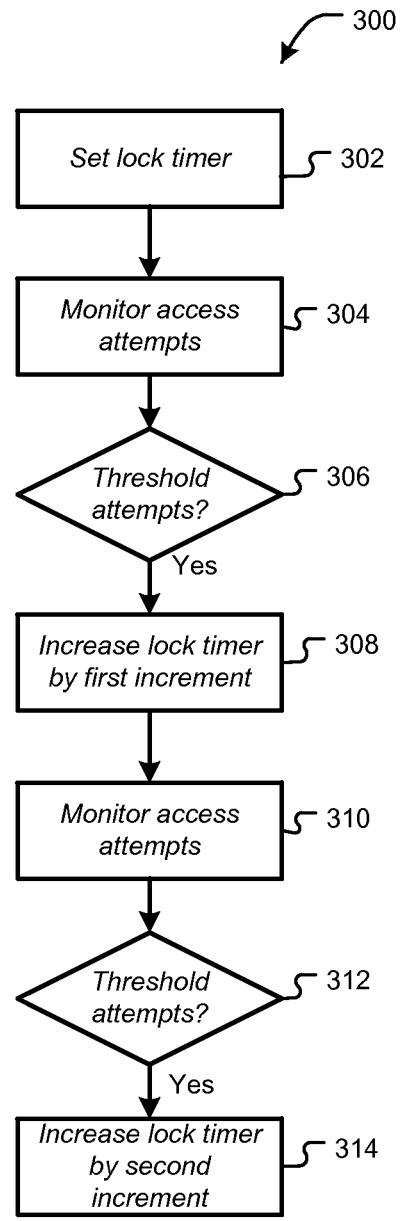
FIG. 6 is a flow chart showing one example of a process flow that may be executed by a transaction node to implement a dynamic lock timer with multiple time-to-expiration increases.

In some examples, the transaction node 4a may increase the time-to-expiration for the lock timer multiple times if access attempts to the object 6a continue to exceed the threshold value. FIG. 6 is a flow chart showing one example of a process flow 300 that may be executed by a transaction node, such as the transaction node 4a, to implement a dynamic lock timer with multiple time-to-expiration increases. Although the process flow 300 is described as being executed by the transaction node 4a, it may be executed by any participating transaction node 4a, 4b, 4n utilizing a lock timer. At 302, the transaction node 4a may set the lock timer 12a to an initial value of a time-to-expiration, as described above. At 304, the transaction node 4a may monitor attempts to access the object 6a. For example, attempts to access the object 6a may be requests (e.g., requests by other processes) for a lock to access the object 6a (e.g., a read lock and/or a write lock). If, at 306, access attempts to the object 6a exceed a threshold value, the transaction node 4a may increase the time-to-expiration of the lock timer at 308 by a first increment.

At 310, the transaction node 4a may continue to monitor attempts to access the object 6a. If the access attempts exceed a second threshold at 310, the transaction node may increase the time-to-expiration of the lock timer 12a by a second increment at 312. The second threshold applied at 310 may be the same threshold applied at 306, or a different threshold. For example, the threshold applied at 312 may be lower than the threshold applied at 306. Similarly, the second increment may be the same as the first increment or different. For example, the second increment may be bigger than the first increment (e.g., a continued high frequency of access to the object 6a may indicate that it is in high demand, suggesting that the transaction node 4a should hold the lock 8a longer). In some examples, the transaction node 4a may continue to monitor access attempts to the object 6a and continue to increase the time-to-expiration of the lock timer 12a when the access attempts exceed a threshold frequency or frequencies.

In some examples, one or more participating transaction nodes, such as the transaction node 4a, may increase the time-to-expiration of the timer 12a and/or an initial value of the time-to-expiration if the transaction node's own access to the object 6a exceeds a threshold frequency. For example, the transaction node 4a may access the object 6a frequently if it is enrolled for multiple assigned operations in a single distributed transaction and/or is enrolled in multiple distributed transactions utilizing the same object 6a. In various examples, the more frequently that a transaction node 4a accesses an object 6a, the more likely it is to need to access it again soon in the future. Accordingly, the transaction node 4a may increase the initial timer setting if it, or similar transaction nodes, have accessed the object 6a at above a threshold rate.

Various examples are described herein with a single participating transaction node 4a, 4b, 4n maintaining a single lock timer 12a, 12b, 12n for a single object 6a, 6b, 6n. It will be appreciated, however, that some participating transaction nodes may receive an assigned transaction operation or operations that involve manipulating multiple objects. Accordingly, participating transaction nodes may maintain multiple lock timers for multiple objects in parallel. In some examples, lock timers for multiple objects may be set to the same value. In some examples, a participating transaction node may updated maintain multiple lock timers for multiple objects independently. For example, the transaction node may execute one or both of the process flows 250, 300 described herein in parallel for one or more lock timers associated with different objects.

Reference in the specification to, "embodiments," "various example embodiments," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components of the environment 10 and the distributed computing system 100 may be and/or are executed by any suitable type of computing device including, for example, desktop computers, laptop computers, mobile phones, palmtop computers, personal data assistants (PDAs), etc. As used herein, a "computer," "computer system," "computer device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

I claim:

1. A system for executing a compensation transaction, the system comprising:
   at least one processor and operatively associated memory, wherein the at least one processor is programmed to execute a transaction node, and wherein the transaction node is programmed to:
   receive from a coordinator node an instruction to execute an assigned operation on an object, wherein the assigned operation is part of a distributed transaction;
   responsive to receiving the instruction, obtain a lock associated with the object, wherein the lock entitles the transaction node to read and write to the object;
   execute the assigned operation;
   set a time-to-expiration of a lock timer to an initial value;
   start the lock timer;
   monitor at least one attempt to access the object by at least one other process while the transaction node holds the lock;

determine that the at least one attempt to access the object exceeds a first threshold number of attempts;

responsive to determining that the at least one attempt to access the object exceeds a first threshold number of attempts, increase the time-to-expiration for the lock timer;

determine that the lock timer has expired; and responsive to determining that the lock timer has expired, release the lock.

2. The system of claim 1, wherein the transaction node is further programmed to, before the lock timer has expired:

receive from the coordinator an instruction to execute a compensation action to reverse the assigned operation; and execute the compensation action.

3. The system of claim 1, wherein the transaction node is further programmed to:

monitor a second at least one attempt to access the object by the at least one other process while the transaction node holds the lock, wherein the second at least one attempt to access the object occurs after increasing the time-to-expiration for the lock timer;

determine that the second at least one attempt to access the object exceeds a second threshold; and responsive to determining that the second at least one attempt to access the object exceeds the second threshold, before the lock timer has expired, increase the time-to-expiration for the lock timer an additional time.

4. The computer system of claim 1, wherein setting the time-to-expiration of the lock timer to the initial value is performed before executing the assigned operation.

5. The computer system of claim 1, wherein the instruction comprises a start time, wherein the start time indicates when the time-to-expiration of the lock timer is set to the initial value.

6. The computer system of claim 1, wherein the instruction comprises the initial value.

7. The computer system of claim 1, wherein the initial value is an expected time for the distributed transaction.

8. The computer system of claim 1, wherein the transaction node, responsive to receiving the instruction, additionally obtains a different second lock associated with a different second object, and sets a different second time-to-expiration of a different second lock timer to a different second initial value.

9. A computer system for executing a distributed transaction, the computer system comprising:

at least one processor and operatively associated memory, wherein the at least one processor is programmed to execute a transaction node, and wherein the transaction node is programmed to:

receive from a coordinator node an instruction to execute an assigned operation on an object, wherein the assigned operation is part of a distributed transaction;

obtain a lock associated with the object, wherein the lock entitles the transaction node to read and write to the object;

execute the assigned operation;

set a time-to-expiration of a lock timer to an initial value;

responsive to successful execution of the assigned operation, start the lock timer;

determine that the lock timer has expired; and release the lock.

10. The computer system of claim 9, wherein the transaction node is further programmed to:

monitor at least one attempt to access the object by at least one other process while the transaction node holds the lock;

determine that the at least one attempt to access the object exceeds a first threshold; and before the lock timer has expired, increase the time-to-expiration for the lock timer a first time.

11. The computer system of claim 10, wherein the transaction node is further programmed to:

after increasing the time-to-expiration for the lock timer, monitor a second at least one attempt to access the object by the at least one other process while the transaction node holds the lock;

determine that the second at least one attempt to access the object exceeds a second threshold; and before the lock timer has expired, increase the time-to-expiration for the lock timer a second time.

12. The computer system of claim 11, wherein increasing the time-to-expiration for the lock timer the first time comprises increasing the time-to-expiration for the lock timer by a first increment, wherein increasing the time-to-expiration for the lock timer the second time comprises increasing the time-to-expiration for the lock timer by a second increment, wherein the second increment is greater than the first increment.

13. The computer system of claim 11, wherein the second threshold is less than the first threshold.

14. The computer system of claim 10, wherein the first threshold is selected from the group comprising a number of access attempts and a frequency of access attempts.

15. The computer system of claim 9, wherein the at least one processor is further programmed to execute a second transaction node, and wherein the second transaction node is programmed to:

receive from the coordinator node a second instruction to execute a second assigned operation on an object, wherein the second assigned operation is also part of the distributed transaction;

obtain a second lock associated with the second object, wherein the second lock entitles the second transaction node to read and write to the second object;

execute the second assigned operation;

set a time-to-expiration of a second lock timer to a second initial value;

determine that the second lock timer has expired; and release the second lock.

16. The computer system of claim 15, wherein the transaction node is executed at a first computing device and the second transaction node is executed at a second computing device.

17. The computer system of claim 9, wherein the transaction node is further programmed to generate a compensation action to reverse the assigned operation.

18. The computer system of claim 9, wherein the transaction node is further programmed to receive from the coordinator node an instruction to execute a compensation action to reverse the assigned operation.

19. The computer system of claim 9, wherein the transaction node is further programmed to determine the initial value of the time-to-expiration.

20. The computer system of claim 9, wherein determining the initial value of the time-to-expiration comprises determining whether the transaction node has accessed the object at greater than a threshold rate.

21. A method for executing a distributed transaction, the method comprising:

executing, by a computing device, a transaction node, wherein the computing device comprises at least one processor and operatively associated memory;

receiving, by the transaction node and from a coordinator node, an instruction to execute an assigned operation on an object, wherein the assigned operation is part of a distributed transaction;

responsive to receiving the instruction, obtaining, by the transaction node, a lock associated with the object, wherein the lock entitles the computing device to read and write to the object;

executing, by the transaction node, the assigned operation;

setting, by the transaction node, a time-to-expiration of a lock timer to an initial value;

starting the lock timer, by the transaction node;

monitor at least one attempt to access the object by at least one other process while the transaction node holds the lock;

determine that the at least one attempt to access the object exceeds a first threshold number of attempts;

responsive to determining that the at least one attempt to access the object exceeds a first threshold number of attempts, increase the time-to-expiration for the lock timer;

determining, by the transaction node, that the lock timer has expired; and responsive to determining that the lock timer has expired, release the lock, by the transaction node.

\* \* \* \* \*